United States Patent

Sargent et al.

[11] Patent Number: 5,247,974
[45] Date of Patent: Sep. 28, 1993

[54] PNEUMATIC SEALING DEVICE FOR WASTE DISPOSAL SYSTEMS

[75] Inventors: Charles L. Sargent; John M. Antos, both of Ann Arbor; George Grech, Garden City, all of Mich.

[73] Assignee: Thetford Corporation, Ann Arbor, Mich.

[21] Appl. No.: 823,356

[22] Filed: Jan. 21, 1992

[51] Int. Cl.⁵ .............................................. E03D 1/00
[52] U.S. Cl. .................... 141/287; 141/312; 141/382; 417/478; 137/899; 4/321; 4/323; 285/97
[58] Field of Search ............... 141/93, 287, 312, 368, 141/382, 383, 392; 4/321, 323; 417/478; 277/34, 34.3; 285/97, 107; 137/355.16, 899

[56] References Cited

U.S. PATENT DOCUMENTS

| | | | |
|---|---|---|---|
| 28,758 | 6/1860 | Lapham | 417/478 |
| 672,475 | 4/1901 | Cavallaro | 285/97 X |
| 1,510,212 | 9/1924 | Du Bois | 277/34 X |
| 2,178,494 | 10/1939 | Richardson | 141/312 |
| 2,960,040 | 11/1960 | Bischoff | 417/478 X |
| 4,469,152 | 9/1984 | Hardee et al. | 141/312 |
| 4,484,626 | 11/1984 | Kerfoot et al. | 277/34 X |
| 4,796,926 | 1/1989 | Rapsilver | 4/323 X |
| 4,909,288 | 3/1990 | Sommer et al. | 141/382 X |
| 5,023,959 | 6/1991 | Mercer | 4/321 |

FOREIGN PATENT DOCUMENTS

| | | | |
|---|---|---|---|
| 1287872 | 9/1972 | United Kingdom | 141/287 |
| 2053129 | 2/1981 | United Kingdom | 141/287 |

*Primary Examiner*—Henry J. Recla
*Assistant Examiner*—Casey Jacyna
*Attorney, Agent, or Firm*—Harness, Dickey & Pierce

[57] ABSTRACT

A temporary sealing device for sealing a waste discharge conduit from an RV to an inlet receptacle of a waste receiving reservoir. The sealing device includes an inflatable bladder which is mounted so as to be positionable between the discharge conduit and the receptacle. A pump inflates the bladder to a size which seals the opening between the receptacle and the conduit to inhibit removal of the conduit and prevent the discharge of waste therearound. The sealing device is also provided with a valve which allows the bladder to be deflated after the transfer of waste and permits the conduit to be withdrawn from the receptacle.

7 Claims, 3 Drawing Sheets

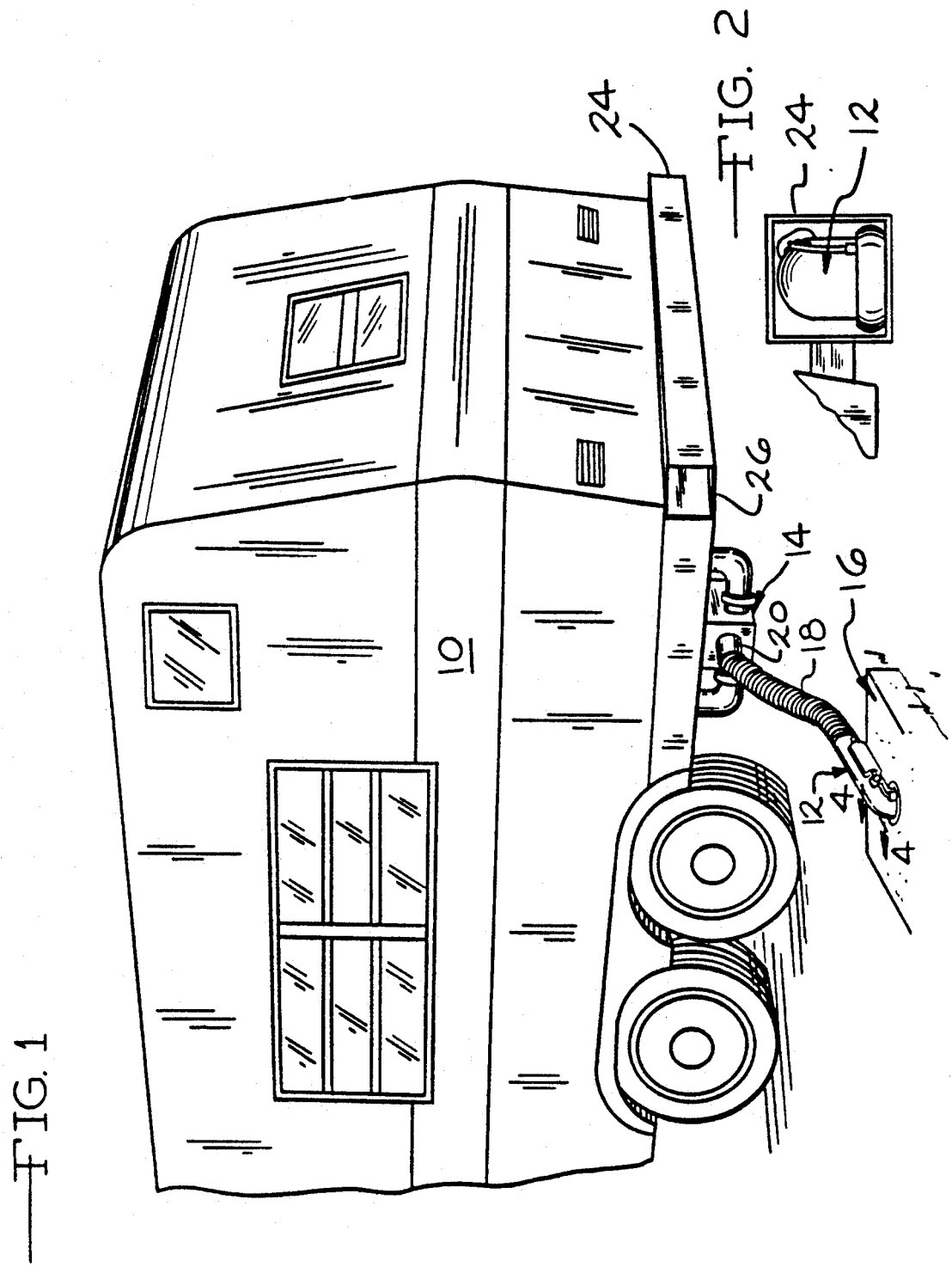

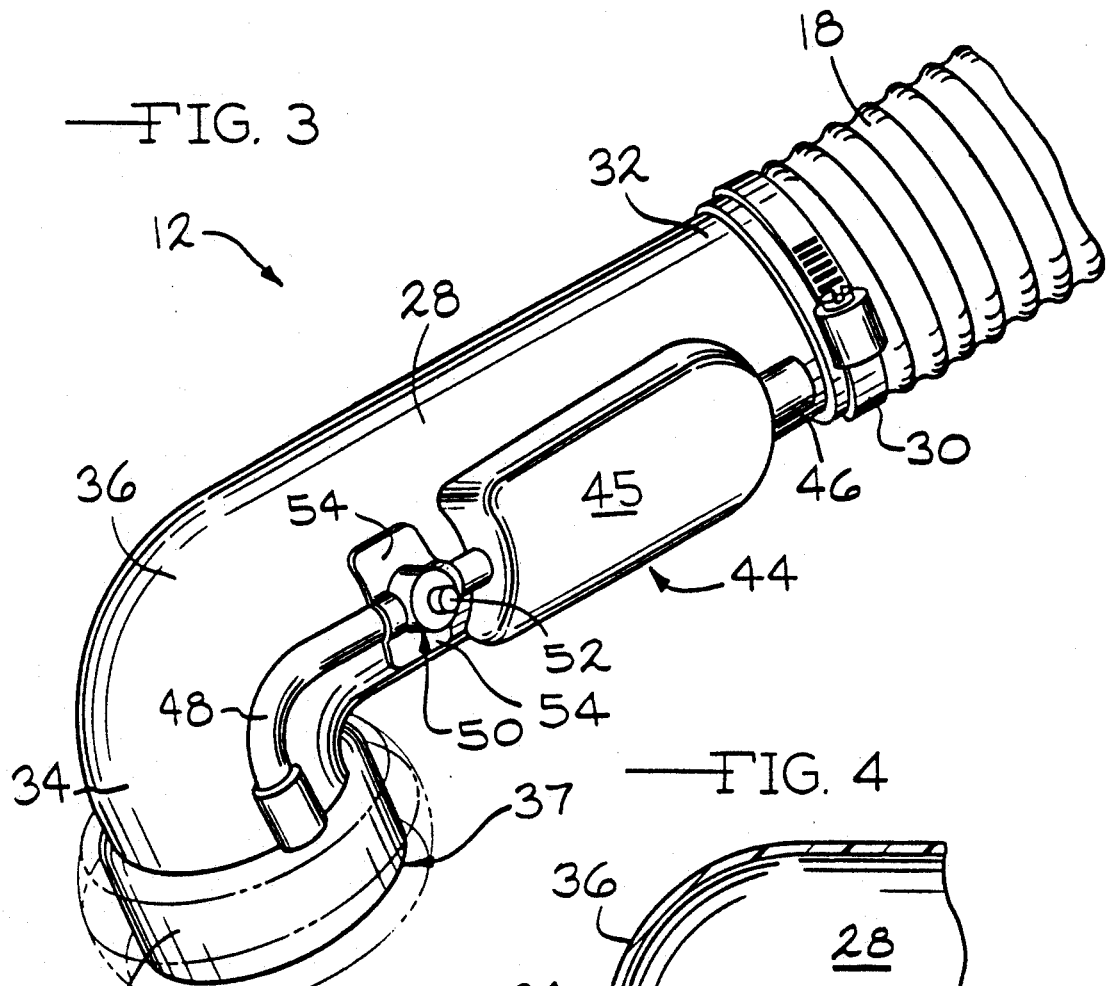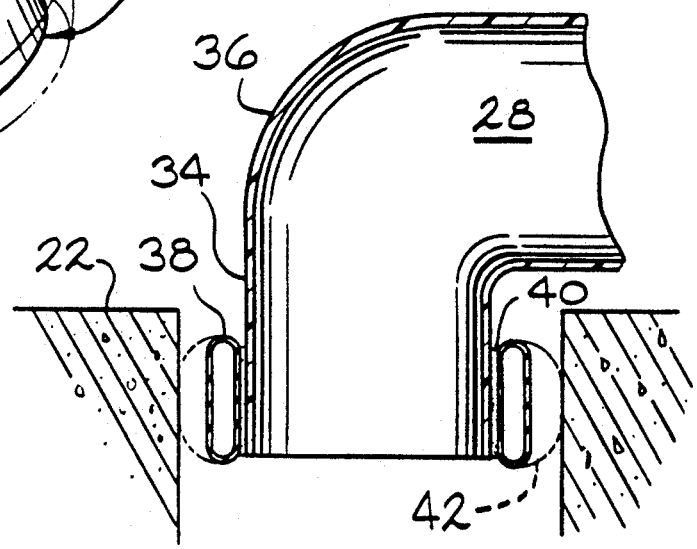

PNEUMATIC SEALING DEVICE FOR WASTE DISPOSAL SYSTEMS

BACKGROUND AND SUMMARY OF THE INVENTION

The invention relates to a sealing device for temporarily sealing a hose to a drain. More particularly, the invention has application for sealing a hose from a waste disposal system of a recreational vehicle to an inlet receptacle of a waste receiving station.

One of the most appalling aspects involved with using a recreational vehicle (RV) is discharging waste from a holding tank of the vehicle into the waste reservoir of an RV sanitation station. Ordinarily, this is accomplished by manually attaching one end of a hose to a discharge outlet of the RV waste holding tank and manually attaching the opposing end of the hose to the inlet receptacle of the waste station or reservoir. Because inlet receptacles at different dump stations may vary in size, the RV operator often must additionally attach, to the outboard end of the hose, an adapter corresponding to the particular inlet receptacle size. Among the limitations of this system is that the method is labor intensive, messy and potentially unsanitary.

With the limitations of the prior art in mind, it is an object of this invention to provide a temporary sealing device which eliminates the need for numerous adapters for the various diameters of inlet receptacles.

It is another object of the present invention to provide a temporary sealing device which will readily secure the waste hose to the inlet receptacle and inhibit its withdrawal while waste is being discharged from the RV.

An additional object of this invention is to provide a temporary sealing device which will likewise inhibit the escape of odorous gas from the dump station between the inlet receptacle and the coupling itself during the discharging of waste.

It is further an object of this invention to provide a coupling which can be readily retrofitted into existing RV waste disposal systems.

In achieving the above objects, the temporary sealing device is provided having an inflatable cuff or bladder. In one embodiment, the outboard end of a discharge hose is attached to a coupling, while the outlet end of the coupling is provided with the bladder on its exterior surface. The outlet end of the coupling is then inserted into the inlet receptacle of the waste dump reservoir so that the bladder is situated within the interior of the inlet receptacle. A pump, provided on the coupling, supplies fluid for inflating the bladder. When inflated, the bladder circumferentially engages the interior of the inlet receptacle and thereby forms a seal between the inlet receptacle and the discharge end of the coupling. Waste may now be transferred from the holding tank of the RV through the hose to the waste dump reservoir.

After the waste has been transferred from the holding tank, the coupling is disengaged from the inlet receptacle by deflating the bladder. A pressure release valve allows the bladder to deflate under forces induced by its own resiliency. The coupling is then removed from the inlet receptacle and the hose and coupling are appropriately stored until their use is again required.

In a second embodiment, the inflatable bladder is provided on the inlet receptacle of the waste dump reservoir. The outlet end of the coupling is inserted into the inlet receptacle so that the bladder encircles therearound. A pump, provided at the dump station, supplies fluid to the bladder for inflation. When inflated, the bladder circumferentially engages the exterior of the coupling and thereby forms a temporary seal between the discharge end of the coupling and the inlet receptacle. Similar to the first embodiment, the coupling is disengaged from the bladder and the inlet receptacle by deflating the bladder through use of a pressure release valve.

The invention thus provides a temporary sealing device which reduces the manual labor involved with attaching the discharge hose, eliminates the need for adapters and prevents the discharge of waste onto the exterior of the waste receiving reservoir where it would be objectionable and present a sanitary hazard.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 illustrates one embodiment of the present invention being utilized to connect the waste holding tank of a recreational vehicle with the inlet receptacle of a waste dump reservoir;

FIG. 2 is a side elevational view of a stored coupling embodying the principles of the present invention;

FIG. 3 is a perspective view of a coupling embodying the principles of the present invention with the inflated bladder being shown in phantom lines;

FIG. 4 is a sectional view taken substantially along line 4—4 in FIG. 1 illustrating one embodiment of the invention being inserted into an inlet receptacle of a waste receiving reservoir.

DETAILED DESCRIPTION OF THE PREFERRED EMBODIMENT

Figure 5:
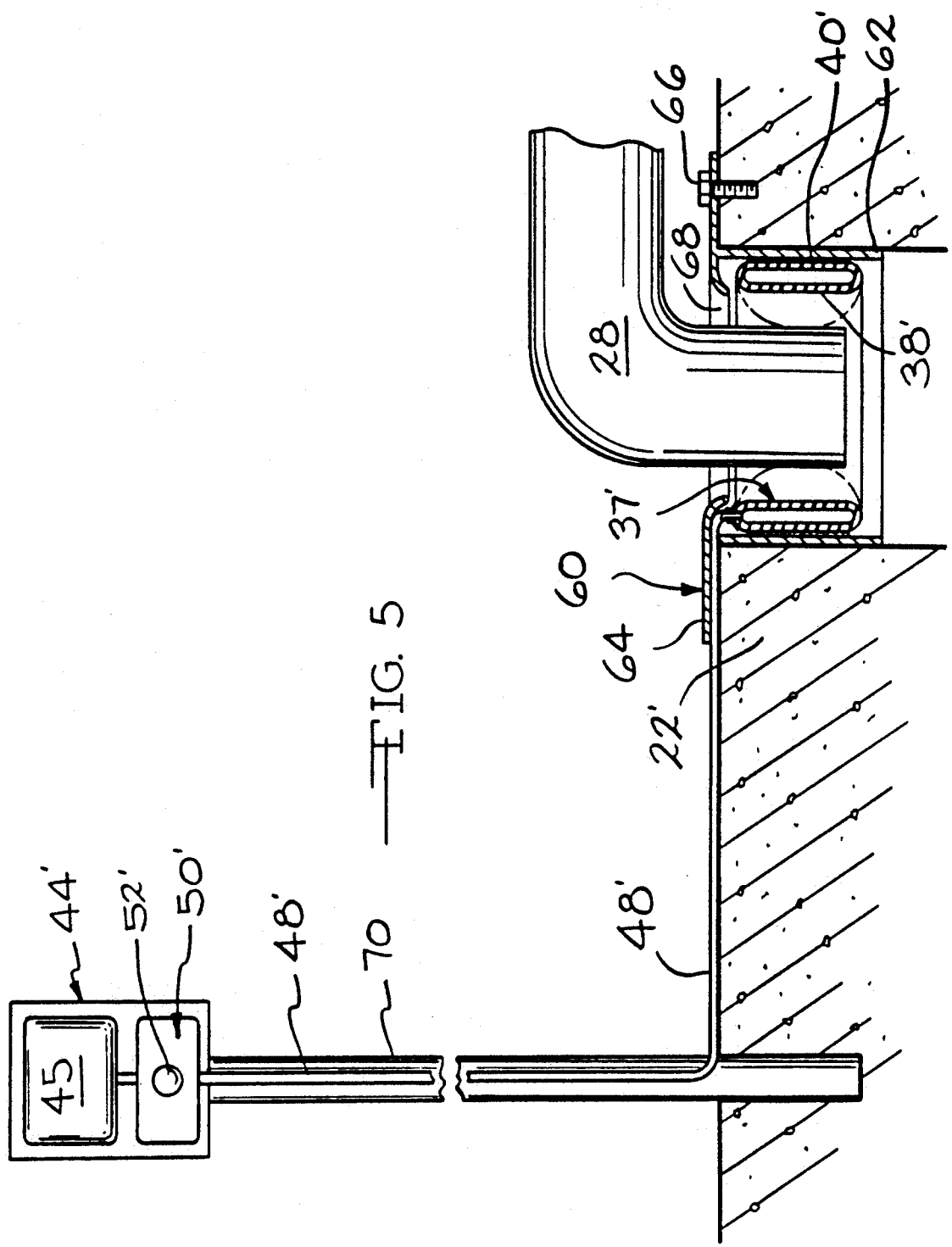
FIG. 5 is a sectional view of a second embodiment of the present invention wherein the invention is incorporated with an inlet receptacle of a waste receiving reservoir.

With reference to the drawing, FIG. 1 generally illustrates a parked recreational vehicle (hereinafter RV) 10 utilizing a coupling 12 embodying the principles of the present invention to facilitate the transfer of waste from the RV 10. Typically, RV waste is stored in a holding tank, a portion of which is shown at 14 in FIG. 1. The waste is transferred from the tank 14 to a waste reservoir 16 at a waste dump station. To connect the tank 14 to the waste reservoir 16, a waste hose 18 is extended therebetween. One end of the hose 18 is connected to a discharge fitting 20 on the tank 14, while the opposing end of the hose 18 is attached to the coupling 12, which is in turn inserted into a inlet receptacle 22 of the waste reservoir 16.

When not in use, the hose 18 and coupling 12 may be stored where convenient in the RV 10. Since space is generally at a premium, one possible place for storage is the rear bumper 24 of the RV 10. To facilitate storage, the rear bumper 24 is hollow and accepts the hose 18 and coupling 12 through an open end 26. Once the hose 18 and coupling 12 have been positioned within the bumper 24, the compartment of the bumper 24 may be sealed or closed by mounting on end cap (not shown) to the open end 26.

A preferred embodiment of the present invention is readily seen in FIG. 3. The coupling 12 includes a conduit 28 which is used to transfer the waste from the hose 18 to the inlet receptacle 22. The outboard end of the hose 18 is attached to an inlet end of the conduit 28 by a clamp 30 or other securing means. This end of the conduit 28 is hereinafter referred to as the hose end 32. The outlet end of the conduit 28 (hereinafter discharge end 34) is inserted into the waste receptacle 22.

The conduit 28 could have various configurations and shapes. In the preferred embodiment, the conduit 28 is generally L-shaped and includes an elbow bend 36 between the hose end 32 and the discharge end 34, generally adjacent to the discharge end 34. The elbow 36 is beneficial in that it helps to remove sag from the hose 18, which can be disruptive of waste flow, by positioning the end of the hose 18 at the lowest possible position, substantially even with the ground. The elbow 36 also assists in maintaining the discharge end 34 of the coupling in the waste receptacle 22 and thereby prevents the discharge of waste onto the exterior of the waste reservoir 16.

The conduit 28 can be formed of various materials, including metals and plastics. Preferably, conduit is formed of polyvinyl chloride (PVC) because of its durability, light weight, and imperviousness to the chemicals associated with waste treatment.

As previously mentioned, inlet receptacles 22 often vary in size from one waste reservoir to another. Previously, it was necessary for the RV owner to carry several adapters. This is undesirable for several obvious reasons. The first reason is again the space constraints of the RV 10. Second, the adapters, in that there are a number of them, are easily misplaced or lost. Finally, the adapters must be manually attached and detached, often resulting in physical contact with the waste.

The present invention eliminates the drawbacks of adapters by entirely eliminating the need for adapters. In place of the adapters, the coupler 12 is provided with a sealing device 37 which may be temporarily inflated. Being inflatable, the sealing device 37 can accommodate all of the varying sizes of inlet receptacles 22 which might be encountered.

In operation, the discharge end 34 of the coupling 12 is inserted into the inlet receptacle 22 and the sealing device 37 is inflated. The inflated sealing device 37 is generally toroidal in shape and obstructs the opening of the waste receptacle 22 around the conduit 28, thereby inhibiting the withdrawal of the conduit 28, the discharge of waste onto the exterior of the waste reservoir 16, and the emission of odors from the waste reservoir 16.

The sealing device 37 will now be described in greater detail Attached to the discharge end 34 of the conduit 28 is an inflatable bladder 38. Preferably, the bladder 38 extends circumferentially around the discharge end 34 and is secured thereto by adhesive 40 or other attaching method. The bladder 38 is made of resilient rubber, or other durable material, which will allow it to inflate and conform to the opening of the inlet receptacle 22. When deflated, as seen in FIG. 4, the discharge end 34 and the bladder 38 together exhibit a diameter which allows for both to be inserted into the opening of the inlet receptacle 22. After being inserted into the inlet receptacle 22, the bladder 38 is inflated to the position generally illustrated by the phantom lines, designated at 42, and seals the opening of the inlet receptacle 22 around the discharge end 34 of the conduit 28.

To inflate the bladder 38, the coupling 12 is provided with a pneumatic hand pump 44. During its actuation, the pump 44 intakes air through an intake port 46 and expels air through an exhaust tube 48 into the bladder 38. Pump 44 is of the type having a resilient body or bellows 45 which is biased into an expanded or inflated position under the influence of forces inherent in the body's material. As such, the body 45 of the pump 44 may be made of a resilient rubber. Other materials could also be used for the body 45 of the pump 44 so long as they contain the necessary characteristics of inflation and deflation allowing for the pump's 44 operation. While the preferred embodiment utilizes a pneumatic hand pump 44, other types of pumps and other working fluids could also be used, including mechanical or electric pumps driving a liquid.

Also contained within the pump 44, but not shown, is one or more valves. The valves readily permit the intake of air through the intake port 46. However, during the compression of the body 45 of the pump 44, the valves are biased to force air to be expelled through the exhaust tube 48 into the bladder 38. In actual use, the pump 44 is worked through a number of actuation cycles until the bladder 38 has been inflated to the desired size and sufficiently obstructs the opening of the inlet receptacle 22.

After the discharge of waste into the dump reservoir 16, the bladder 38 is deflated. A release valve 50 is mounted in line with the exhaust tube 48 to assist in permitting deflation. The release valve 50 can be one of numerous types presently available. In the preferred embodiment the release valve 50 includes a biased plunger or button 52 which, when depressed, permits the interior of the bladder 38 to communicate with the surroundings through the exhaust tube 48, thereby allowing the bladder 38 to deflate under the forces provided by the resiliency of the rubber and atmospheric pressure.

The pump 44 and its related structures are shown as being mounted directly to the conduit 28. This mounting is preferred because it decreases the chances that the pump 44 and the associated structures will be lost, broken or severed from the bladder 38. The pump 44, intake port 46, exhaust tube 48 and release valve 50 may be secured to the conduit 28 by adhesives, screws, or other securing methods. To facilitate mounting, the various structures may include mounting flanges 54. For the sake of clarity, mounting flanges 54 are only illustrates in relation to the release valve 50.

An alternative embodiment is illustrated in FIG. 5. The alternative embodiment includes a significant number of features which are common to both embodiments. For this reason, corresponding features of the second embodiment are designated with a prime (').

The sealing device 37' includes an inflatable bladder 38' which is secured interiorly of the opening defined by the inlet receptacle 22'. The bladder 38' extends circumferentially around the interior of the inlet receptacle 22' and is secured therein by a mounting bracket 60. The mounting bracket 60 includes a cylindrical portion 62 which extends into the inlet receptacle 22' and a flange 64 prevents the bracket from being dropped into the waste reservoir 16. A fastener 66 is inserted through the flange 64 to securely attach the mounting bracket 60 to the inlet receptacle 22'. The bladder 38' is mounted to the interior of the cylindrical portion 62 by adhesive 40' or another well known securement method. So mounted, the bladder 38' defines an opening into which the discharge end 34 of the conduit 28 may be inserted. To protect the bladder 38' during the insertion of the conduit 28, the mounting bracket 60 is provided with a downwardly and inwardly turned guide lip 68 which extends so as to cover the deflated bladder 38' from above.

After the discharge end 34 of the conduit 28 has been inserted into the opening being defined by the guide lip 68 and the bladder 38', the bladder 38' is inflated to contact and conform to the exterior surface of the conduit's discharge end 34, thereby sealing the opening of the inlet receptacle 22'. As in the previous embodiment, the bladder 38' is made of resilient rubber or other durable material which will allow it to inflate and conform to the exterior surface of the discharge end 34 of the conduit 28.

To inflate the bladder 38', the seal 37' is also provided with a pump or inflation means 44'. For ease of operation and construction, the inflation means is preferably one of the pneumatic hand pump variety. The pump 44' is actuated and constructed analogously to pump 44 of the previous embodiment, like elements again designated with like numbers bearing a prime (') designation. As such, the pump 44' includes a resilient body or bellows 45' having valves (not shown) which readily permit the intake of air through an intake port (not shown). When the bellows 45' is compressed, air is forced through the exhaust tube 48' to inflate the bladder 38'. The bladder 38' is deflated through its own resiliency once a release valve 50' has been actuated. To simplify construction and costs, the release valve 50' is preferably of a type which may be actuated through a biased plunger 52' or other common actuator mechanism.

In the embodiment of FIG. 5, the pump 44' is mounted to a post 70 extending upward from the inlet receptacle 22'. By elevating the pump 44', its operation is more easily accomplished by one wishing to dispose of waste into the waste reservoir 16. The elevated mounting likewise prevents the pump 44' from becoming soiled with waste in the event of an inadvertent discharge of waste prior to the insertion or sealing of the coupling 28 in the inlet receptacle 22'.

While the above description constitutes the preferred embodiments of the present invention, it will be appreciated that the invention is susceptible to modification, variation and change without departing from the proper scope and fair meaning of the accompanying claims.

We claim:

1. A recreational vehicle waste disposal system for transferring waste into a waste reservoir through an inlet opening of the waste reservoir, said disposal system comprising:

a waste holding tank for receipt and storage of waste generated during use of the recreational vehicle, said waste holding tank including a discharge fitting;

a waste hose for transferring waste from said waste holding tank, said waste hose having first and second ends, said first end adapted to be connected to said discharge fitting of said waste holding tank;

a conduit having inlet and outlet ends, said inlet end being secured to said second end of said hose and forming a discharge conduit therewith, said outlet end having an exterior diameter of a size allowing said outlet end to be inserted into the inlet opening of the waste reservoir;

an inflatable bladder formed of resilient material and being exteriorly mounted to said conduit adjacent said outlet end, said bladder being concurrently insertable into the inlet opening with said outlet end;

inflating means mounted to said discharge conduit for inflating said bladder and enabling said bladder to engage the inlet opening in sealing contact substantially circumferentially around said conduit thereby inhibiting withdrawal of aid conduit from the inlet opening during the transfer of waste from said waste holding tank through said waste hose into the waste reservoir; and deflating means mounted to said discharge conduit for deflating said bladder thereby permitting removal of said conduit from the inlet opening of the waste reservoir.

2. A recreational vehicle waste disposal system as set forth in claim 1 wherein said deflating means includes a release valve being manually operable for releasing air from within said bladder and thereby deflating said bladder.

3. A recreational vehicle waste disposal system as set forth in claim 1 wherein said conduit includes an L shaped bend between said inlet and outlet ends, said bend orienting said inlet end and said outlet end substantially ninety degrees apart, said bend assisting in maintaining said outlet end of said coupling in the inlet opening and removing sag from said hose during use.

4. A recreational vehicle waste disposal system as set forth in claim 1 wherein said inflating means is a manually operable bellows pump mounted to said discharge conduit.

5. A sealing device as set forth in claim 4 wherein said inflating means is a bellows pump mounted to said discharge conduit along one side wall thereof, said pump being coupled to said bladder by an exhaust tube extending along side of said house and said conduit.

6. A sealing device as set forth in claim 5 wherein said deflating means is a manually operated release valve mounted on said discharge conduit and in line with said exhaust tube.

7. A sealing device as set forth in claim 6 wherein said release valve is a plunger valve.

* * * * *

UNITED STATES PATENT AND TRADEMARK OFFICE
CERTIFICATE OF CORRECTION

PATENT NO. : 5,247,974
DATED : September 28, 1993
INVENTOR(S) : Charles L. Sargent, John M. Antos and George Grech It is certified that error appears in the above-indentified patent and that said Letters Patent is hereby corrected as shown below:

In Column 3, line 55, after "detail", insert --.--.

In Column 6, line 22, Claim 1, delete "aid" and insert in place thereof --said--.

Signed and Sealed this

Twenty-eighth Day of June, 1994

Attest:

BRUCE LEHMAN

*Attesting Officer*    *Commissioner of Patents and Trademarks*